United States Patent
Ditria et al.

(10) Patent No.: US 6,197,095 B1
(45) Date of Patent: Mar. 6, 2001

(54) SUBSEA MULTIPHASE FLUID SEPARATING SYSTEM AND METHOD

(76) Inventors: John C. Ditria, 5214 Norborne La., Houston, TX (US) 77069; David A. Hadfield, Sawacdee, Loxwood Road, Rudawick (GB), RH10 3DW ( * ) Notice: Subject to any disclaimer, the term of this patent is extended or adjusted under 35 U.S.C. 154(b) by 0 days.

(21) Appl. No.: 09/250,584

(22) Filed: Feb. 16, 1999

(51) Int. Cl.[7] .................................................. B01D 19/00
(52) U.S. Cl. .............................. 95/248; 95/253; 95/259; 95/260; 96/182; 96/217; 166/267; 166/357; 210/188
(58) Field of Search ............................. 95/241, 243, 248, 95/252, 253, 259, 260; 96/155, 182, 183, 184, 217; 166/267, 357; 210/188, 259, 806

(56) References Cited

U.S. PATENT DOCUMENTS

| | | | |
|---|---|---|---|
| 2,767,802 | * 10/1956 | Orrell | 166/357 |
| 2,856,470 | * 12/1958 | Sochor | 95/248 |
| 3,536,135 | * 10/1970 | Dozier | 166/357 |
| 3,704,567 | * 12/1972 | Engel | 96/183 |
| 3,754,380 | * 8/1973 | McMinn et al. | 166/357 |
| 3,759,324 | * 9/1973 | Mecusker | 166/267 |
| 3,913,560 | * 10/1975 | Lazarre et al. | 96/155 |
| 4,438,817 | * 3/1984 | Pokladnik et al. | 166/357 |
| 4,626,360 | * 12/1986 | Senyard, Sr. et al. | 95/253 |
| 4,737,282 | * 4/1988 | Senyard, Sr. et al. | 96/183 |
| 4,848,475 | * 7/1989 | Dean et al. | 166/357 |
| 4,948,393 | * 8/1990 | Hodson et al. | 95/253 |
| 5,044,440 | * 9/1991 | Stinessen et al. | 166/357 |

(List continued on next page.)

FOREIGN PATENT DOCUMENTS

| | | | |
|---|---|---|---|
| 211492 | * 2/1987 | (EP) | 95/241 |

OTHER PUBLICATIONS

Advertisement for Kvaerner Process Systems entitled "G–SEP Deoiling Hydrocyclones", Kvaerner Process Systems US Inc., 262 N. Sam Houston Parkway East, Suite 300, Houston, TX 77060–2012, USA.

Reprinted article from *Energy Day* issue of Monday, Mar. 24, 1997, entitled "Special Report: Subsea Technology".

Advertisement for ABB Offshore Technology entitled "SUBSIS", ABB Offshore Technology AS, Bergeveien 12, PO Box 81, N–1361 Billingstad, Norway.

(List continued on next page.)

*Primary Examiner*—Duane S. Smith
(74) *Attorney, Agent, or Firm*—Kenneth L. Nash (57) ABSTRACT

A subsea multiphase fluid separation system and method are disclosed which provide for efficient and reliable remote separation operation at deep and ultra deep water depths including depths of ten thousand feet or more. The system is preferably of modular construction wherein the modules are secured in a single frame to be lowered as a unit to the seabed. The system utilizes reliable cyclonic operation. The sequence of process steps is designed to make the system more efficient as compared to surface separating systems and thereby permit a more compact size as is desirable for subsea operation. The method of operation includes up to five basic process steps with the initial step in one embodiment including cyclonically separating solids. In a presently preferred embodiment, the cyclonic solids separator is sized to eliminate solids greater than fifty microns. A second stage is directed to cyclonically removing bulk gas from the liquid in either a cyclone or auger separator. A liquid-liquid hydrocyclone for the third stage acts to preseparate the fluid either by separating and/or by coalescing oil droplets in a water continuous stream and/or water droplets in an oil continuous stream. A fourth stage gravity separator is significantly smaller for the flow throughput as compared to surface separating systems due to earlier separation processes and due to the option of subsequent oily-water separation in a deoiling liquid-liquid hydrocyclone.

43 Claims, 1 Drawing Sheet

U.S. PATENT DOCUMENTS

| | | | | |
|---|---|---|---|---|
| 5,154,741 | * | 10/1992 | Da Costa Filho | 166/357 |
| 5,302,294 | * | 4/1994 | Schubert et al. | 96/183 |
| 5,477,924 | * | 12/1995 | Pollack | 166/357 |
| 5,490,562 | * | 2/1996 | Arnold | 166/267 |

OTHER PUBLICATIONS

Advertisement for Kvaerner Process Systems entitled "Configurable Subsea Water Separation System (CoSWaSS)".

SPE Applied Technology Workshop, Eden, Bob et al., "Subsea Production: No Barriers to the Future", Oct. 12–16, 1997.

"Technology Digest", JPT, Dec. 1997, p. 1296.

De Luca, Marshall, "Deepwater Drilling & Production", *Offshore*, Sep. 1997, pp. 38–50.

Dolivo, Eloi, "Exploration—What's been drilled, found in world's deepwater areas", *Oil & Gas Journal*, Aug. 25, 1997, pp. 104–110.

"Non–U.S. firms making their marks in sizzling Gulf of Mexico plays", *Oil & Gas Journal*, Sep. 1, 1997, pp. 23–30.

Ditria, John, "Design Basis of a Compact Production System for Minimum Size and Maximum Flexibility", Krebs Petroleum Technologies, Production Separation Systems, IBC Conference, Nov. 17–18, 1997, Houston, TX.

* cited by examiner

FIG. 1

SUBSEA MULTIPHASE FLUID SEPARATING SYSTEM AND METHOD

BACKGROUND OF THE INVENTION

1. Field of the Invention

The present invention relates generally to a system and method for subsea separation of well fluids and solids and, more particularly, to a compact separating system that may be deployed and operated at deep and ultra-deep water depths for processing well fluids and solids prior to transport to the surface, or disposal either subsea or to the surface.

2. Description of the Background

In recent years, the oil and gas industry has found significant oil and gas reserves in deepwater offshore locations. Many discoveries have been made in over three thousand feet of water with a number of high potential discoveries being located in over five thousand feet of water. In the not too distant future, discoveries in depths of over ten thousand feet are inevitable. As the production depths increase, the cost of transporting well fluids from the seabed to the surface also increases. Transporting well fluids that contain significant amounts of undesirable solids and water from significant depths limits the flow of the desirable hydrocarbon products to the surface due to significant cost limitations of the internal diameter of the riser pipe from the sea bottom. Not only are there significant inefficiencies associated with transporting multi-phase fluid flow from the seabed but also there are other high costs including production problems such as erosion, corrosion, and hydrate formation. At the present time, technical and economical limitations effectively prevent profitable deepwater production. As the depths reach new levels, there is no current technology that can be used to commercially exploit deep water reserves. On the other hand, the medium to longer term strategic business plans of some oil and gas producers are dependent on the finding of appropriate technology to exploit deep water reserves.

The methods currently available to produce and separate the constituent hydrocarbon products from associated solids and produced water utilize production separation equipment that is located topside on fixed or floating facilities. It would be highly desirable if there were means to reduce the cost of these facilities and avoid the other aforementioned costs with a commercially feasible method of separating by-products of oil and gas production at the seabed. Unfortunately, the methods and systems for separating multiphase fluids presently used are not feasible in the remote, hostile, and problematic environment at the seabed in deep waters. Nonetheless, such a highly desirable means would preferably separate some unprofitable by-products, namely water and solids, on the seabed and dispose of them into the reservoir and/or onto the seabed.

Numerous speculative subsea separation solutions have been put forward where either one or two such separation processes occur. However, these processes are based on the use of conventional equipment that operates in a manner consistent with topside operations. These solutions fail to address all the issues associated with subsea separation because the adoption of conventional technology is impractical to use as a seabed system. For instance, in one proposed subsea separation method put forward, it is submitted the reliability is highly suspect due to unsolved problems that might be encountered such as erosion, corrosion, hydrate formation, and that furthermore the efficiency of the system is too low such that it would have flow through rates that are unprofitably low. In another proposed subsea system, the size of the system to be placed underwater is so large as to make the system economically unfeasible for use at significant depths. Topside systems cannot simply be lowered onto the seabed because of numerous problems that are encountered thereby.

It is submitted that the above discussed proposals for subsea operation do not provide a compact subsea production system that is commercially feasible for producing from significant depths. Consequently, there remains a need for an improved and compact deepwater production separation system that is capable of efficiently separating the constituents of hydrocarbons production, namely oil, gas, water, and solids. It would be desirable to have a system designed to operable in virtually any water depth and having significantly reduced size with respect to production efficiency as compared to existing technology. Thus, such a system would lend itself to be of particular value to production in much greater depths, such as water depths over ten thousand feet deep or more. Those skilled in the art have long sought and will appreciate the present invention which provides solutions to these and other problems.

SUMMARY OF THE INVENTION

Therefore, it is an object of the present invention to provide an improved subsea separation system and method.

Another object of the present invention is to provide a subsea system that is suitable for remote operation in that the components efficiently operate with a wide range of multiphase fluids.

Yet another object of the present invention is to provide a system that utilizes inherently reliable cyclonic action to provide the system reliability required for remote operation.

Yet another object of the present invention is a system design that results in the reduction of mobilization and demobilisation costs.

A presently preferred feature of the invention is a process that separates at an initial stage by-products that otherwise may cause damage to downstream production elements such as pipework, valves, and vessels through corrosion, erosion, and hydrate formation.

Another presently preferred feature of the invention is a process that separates bulk gas after removal of solids to enhance solids removal, promote operation of subsequent liquid-liquid hydrocyclone operation, and reduce the size required for the gravity separator.

A presently preferred advantage of the present invention is that a much smaller gravity separator can be used than would be practical for typical surface separation operation.

Another advantage of the present invention is a presently preferred modular construction of the system components for use in a single housing or frame for reliable transport to the ocean floor.

These and other objects, features, and advantages of the present invention will become apparent from the drawings, the descriptions given herein, and the appended claims. However, it will be understood that the above discussed presently preferred and/or available objects, features, and advantages of the method and system of the present invention are not all inclusive, represent only a few of the objects, features, and advantages, and are not intended to limit the invention or claims to the invention in any way but are merely intended as an aid to those of skill in the art having interest in practicing the invention for those purposes.

Thus, a subsea method for separation of multiphase production fluids from one or more wells drilled below a body of water is disclosed that comprises steps such as positioning separation equipment below a surface of the body of water and in proximity with the one or more wells. The one or more wells are connected to the separation equipment to introduce the multiphase production fluids to the separation equipment. The separation equipment is operated in a definite sequence. In one embodiment of the invention where solids are or may be present in the fluid, the solids are first separated from the multiphase production fluids to produce the solids and a first stage processed fluid. If gas is present in the first stage processed fluid, the bulk gas and liquids are then separated from the first stage processed fluid to produce a gas output and a second stage processed fluid. When water is or may be present, the second stage fluid is preseparated to produce a third stage processed fluid. Oil and water and any residual gas are separated from the third stage processed fluid in the fourth stage to produce an oil output and a fourth stage processed fluid. Finally, cleaning of the fourth stage processed fluid yields a water output and residual oil.

A cyclone separator is utilized for the separating of solids from the multiphase production fluids. A cyclone or auger separator is utilized for the separating of gas and liquids from the first stage process fluid. A first liquid-liquid hydrocyclone is utilized for the preseparating of the second stage processed fluid. A gravity separator vessel may be utilized for the separating of oil and water and any residual gas from the third stage processed fluid, and a second liquid-liquid hydrocyclone is utilized for the cleaning of the fourth stage processed fluid.

Prior to the step of positioning the separation equipment under the water, a single framework for rigidly supporting the separation equipment as a unit is provided for which the method further comprises steps such as providing a first modularly constructed component comprising the first liquid-liquid hydrocyclone that is rigidly attachable to the single framework. A second modularly constructed component may comprise the second liquid-liquid hydrocyclone and is provided so as to be rigidly attachable to the single framework. A third modularly constructed component may comprise the gravity separator vessel that is provided so as to be rigidly attachable to the single framework. A fourth modularly constructed component may comprise the cyclone or auger separator. A fifth modularly constructed component may comprise the cyclone separator for initially removing solids from the fluids.

In a preferred embodiment, the feed composition to the preseparator liquid-liquid hydrocyclone may be monitored, and the flow split across a plurality of outputs from the preseparator liquid-liquid hydrocyclone is adjusted. The step of separating solids from the multiphase production fluids in one preferred embodiment may be designed to remove solids having a particulate size greater than fifty microns due to the significant problems that those size particles tend to create.

More generally, the subsea method for separation of multiphase production fluids from one or more wells drilled below a body of water comprises operating the separation equipment for separating phases of the multiphase production fluids such that at least two of the following five processes are provided: separating solids from the multiphase fluid, separating a gas phase and a liquid phase, liquid-liquid preseparating to enhance separation of an oil phase and a water phase, gravity separating the oil phase and the water phase, and cleaning oily water to produce water and residual oil. Each of the at least two of the five processes, when used, is operated in an order of operation as follows: the step of separating solids from the multiphase fluid, the step of separating the gas phase and the liquid phase, the liquid-liquid preseparating, the step of gravity separating, and the step of cleaning oily water to produce water and residual oil.

As discussed above, a cyclone separator is used for the step of separating of solids from the multiphase production fluids. A cyclone or auger is used for the step of separating the gas phase and the liquid phase. A liquid-liquid hydrocyclone is used for the step of liquid-liquid preseparating. A gravity separator is used for the step of gravity separating, and a liquid-liquid deoiling hydrocyclone for the step of cleaning oily water to produce water and residual oil. Preferably a single frame is provided and each of the components is rigidly secured to the single frame to form the separation equipment.

Thus, a subsea system is disclosed for separating a multiphase fluid from one or more subsea wells. The subsea system comprises a separator system frame for rigidly supporting the subsea system so as to be suitable for operation in a subsea environment. In general terms, at least two of the following five components are rigidly secured to the separator system frame consisting of the following: a cyclone separator operable for removing solids from the multiphase fluid, a cyclone or auger separator operable for removing a gas phase from a liquid phase, a preseparator liquid-liquid hydrocyclone operable for enhancing separation of an oil phase and a water phase, a gravity separator operable for separating the oil phase and the water phase, and a deoiling liquid-liquid hydrocyclone operable for deoiling oily water.

The at least two of the five components are interconnected with each other such that when used each of the at least two of the following five components are arranged in the following sequence of operation for processing the multiphase fluid: the cyclone separator for separating solids and fluid, the cyclone or auger separator for separating bulk gas and fluid, the preseparator liquid-liquid hydrocyclone for preseparating oil and water, the gravity separator for separating oil, water, and any residual gas, and the deoiling liquid-liquid hydrocyclone.

In one embodiment used where sand may occur in the production fluid, the system comprises the cyclone separator operable for removing solids from the multiphase fluid and at least two of the five components other than the cyclone separator.

In another embodiment where water and oil may be included in the production fluid, the system comprises the gravity separator and the at least two of the five components other than the gravity separator.

The claims to the invention appended to this specification are intended to be given a full breath of interpretation consistent with the language used in the claims and suitable equivalents thereof especially in light of the specification and drawings.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in th e appended claims.

DETAILED DESCRIPTION OF THE PREFERRED EMBODIMENTS

The present invention is a modular, multi-component system that utilizes predominately cyclonic technology. The present invention provides a unique and integrated approach to packaging of separation systems. The present invention is designed to meet the problems of operating in a new, isolated, and hostile subsea environment. The performance of the system is superior to previous attempts to provide subsea separation processing in terms of increased system reliability as well as overall higher separation efficiencies that allows for a smaller system package. The system of the present invention has high operational flexibility for separation processing of oil, water, gas, and solids. The composition and/or flow rate of each component can vary significantly without detrimental effect on system performance. In a subsea environment, this is especially important in situations where fluid property information is poor, misunderstood, or completely lacking.

Figure 1:
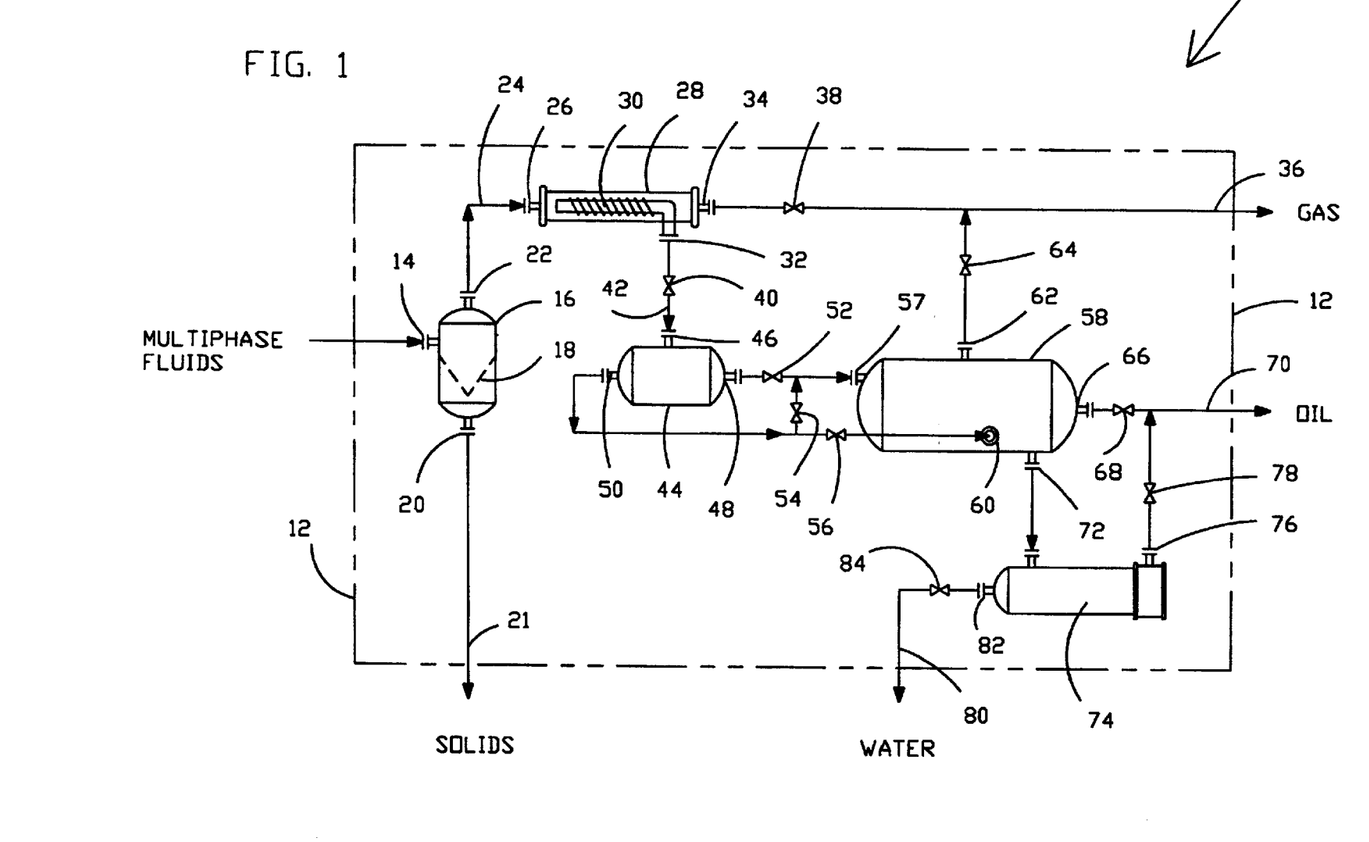
FIG. 1 is a schematic view of components for a separating system that operates in accord with the method of the present invention.

Referring now to FIG. 1, a presently preferred embodiment of subsea separator system 10 in accord with the present invention, is illustrated. For reasons discussed subsequently, the order of operation of the steps of separation processing in system 10 is important. The benefits obtained from processing in the order of operation discussed include a reduction in overall system size. The large gravity separator normally used on the surface is not economically feasible for deep subsea operation. The present invention substantially reduces the size needed for the gravity separator to otherwise obtain the same throughput. Therefore system 10 offers a great improvement over previous attempts of subsea separation which have attempted to use large gravity separators at relatively shallow depths. The smaller size of the system reduces maintenance costs, mobilization costs, and demobilization costs. The lower capital and operating costs are particularly significant for use in deepwater operation.

The components of system 10 are modular and interact and fit like small interchangeable building blocks. This gives significant economic flexibility due to ease of system expandability. The separation modules are used only when required and are then preferably incorporated into a unitary design such as a frame or housing indicated at 12. The single frame or housing 12 affixes the modules together into unitary form so as to be durable and sturdy for lowering onto and operation at the seabed.

As discussed in greater detail hereinafter, system 10 provides an effective method of handling solids. The problem of solids removal has been largely ignored with respect to prior attempts to provide a subsea separation system. The solution to solids removal provided by system 10 reduces the frequency of intervention and lowers operating costs.

A connection to subsea wells that produce multiphase fluids is indicated at 14 of module 16 for stage 1 operation that is preferably a cyclone separator as indicated by dashed internal cyclone 18. The majority of produced solids tend to be greater than 50 microns in size. Moreover, it is this size range of solids that is believed by the inventors to contribute most to erosion and corrosion in process equipment. The preferred cyclone separator module 16 for remote subsea separation processing therefore takes advantage of this fact and includes cyclone 18 sized such that solids greater than approximately 50 microns will travel down the length of cyclone 18 to solids output 20 whereas gasses and liquids flow to outlet 22. Solids leave system 10 as indicated at 21 as discussed subsequently. When more information is known about the well production fluids, other size cyclone separator modules could be used alternatively or in addition that would handle smaller size solids as desired. Thus, cyclone separator module 16 is preferably sized to remove especially those solids of fifty micron diameter and greater that otherwise typically cause blockages of equipment, including but not limited to pipework, valves and vessels. Moreover, the solids separated at this stage tend to be water wet, and as such do not yet tend to form problematic agglomerated masses as may occur, for instance, in gravity separators or other downstream separation equipment, where the solids may be in contact with oil for prolonged periods of time.

Another advantage of module 16 is that the removal of solids, especially in this size range, acts to maintain more efficient operation of other downstream separating equipment and especially the smaller size downstream equipment that is more desirable for subsea operation. This is because such solids present in liquid emulsions have a stabilizing effect that inhibits coalescence and separation of oil and water. The removal of the solids prevents the stabilizing effect.

Module 16 also takes advantage of the fact that the presence of gas in the multiphase fluids optimizes the performance of cyclone type solid separators by reducing the viscosity and density of the multiphase fluids thereby aiding the removal of solids prior to removing the gas phase from the multiphase fluid. Other proposed attempts at subsea separation processes have been designed to remove gases from the multiphase fluid first. However, those designs make solids removal less efficient than that of system 10. Solids removed by module 16 include sand and other particulate matter. Unless it is known that little or no solids are present in the production fluids, then it is highly desirable to include solid removal module 16 at the location indicated in system 10 at the beginning of the separation process. Solid removal module 16 will typically strongly influence the mechanical integrity, the process performance, and reliability of system 10.

In situations where it is known that little or no solids will be present in initial and/or subsequent multiphase fluid flow, then the modular construction of system 10 permits easy construction of system 10 without module 16 whereby the next desired stage, as the stages are discussed subsequently, can be the input. It will be noted that if any modules are left out of system 10 design, then the utilized modules are still preferably ordered as shown by the arrows of FIG. 1 and as discussed herein.

As indicated by the flow arrows of FIG. 1, processed fluid from solids removal module 16 flows through modular interconnections as indicated at 24 to input 26 of bulk gas-liquid separation module 28 for stage 2 operation in accord with a presently preferred embodiment of the method of the present invention. Placement of module 28 directly after solids removal and before oil and water separation is especially useful for a subsea separation system in accord with the present invention. Placement of module 28 at this position reduces significantly the size and weight of the gravity separator, discussed subsequently, and in turn further reduces the size and weight of overall system 10 in accord with the present invention. This is because the gravity separator then requires less volume to process and separate gas from liquid. Moreover, in the design of system 10, bulk gas removal must occur for the satisfactory operation of stage 3, discussed hereinafter, due to the detrimental effects of gas in a pre-separator liquid-liquid hydrocyclone. A reduction of gas in the fluids substantially lowers fluid velocity to thereby reduce emulsion forming characteristics and enhance oil and water separation in the downstream equipment. The reduction in gas in the fluids also results in a substantial reduction of foam formation that further enhances oil and water separation in the downstream equipment of system 10. The reduction in emulsions and foam/spume formation reduces or eliminates the need for costly chemical injection facilities. As with solids cyclone remover module 16, cyclone or auger gas removal module 28 may be eliminated from system 10 if little or no gas is known to be in the production fluid either during initial flow or subsequent flow of the one or more wells that may be drilled. Gas separation is preferably accomplished with either a cyclone or auger type gas liquid separator. Tangential forces created by blades 30 and otherwise by a cyclone portion of separator 28 causes liquids to flow towards the outer wall due to the difference in phase density so that the processed liquid leaves by tangential flow path from bulk gas-liquid separation module 28 at liquid outlet 32 for stage 3 processing as discussed subsequently. The majority of gas is removed at this time and exits at gas outlet 34 and leaves system 10 at a gas outlet connection as indicated at 36. Valve 38 controls gas flow and valve 40 controls liquid flow from module 28. As the cyclone or auger type separator operates efficiently over a wide range of gas void fractions, the cyclonic type operation of either the cyclone or auger type bulk gas separator is ideal for subsea remote operation where the gas void fraction is unknown or may vary as the field is produced.

The reduction in the gas permits use of a simplified oil/water composition monitor for the control of downstream oil and water separation equipment so as to eliminate the need for expensive and often unreliable multiphase flow meters. Thus, oil/water composition may be monitored, such as at point 42, for oil/water composition.

Stage 3 preferably includes the oil/water conditioning or separation stage and is referred to here as a preseparating stage that is intended to include both the process of coalescence of oil and/or water droplets fluid conditioning and/or initial oil/water separation. Module 44 is preferably a preseparator liquid-liquid hydrocyclone with input at 46.

Separated bulk oil phase output is at 50 and separated bulk water phase output is at 48. Preconditioned fluid output is the combination of 48 and 50. Valves 52, 54, and 56 are used to control flow split across preseparator liquid-liquid hydrocyclone module 44 while monitoring feed composition such as at 42. Preseparator module 44 ensures that the gravity separator handles only simple to separate water continuous or oil continuous streams and shifts the mixture composition away from the phase inversion point. The result is that system 10 of the present invention requires a greatly reduced size and weight gravity separator. Module 44 may be used to separate the bulk water from the liquid stream. Moreover, by conditioning the fluid stream by coalescence of oil and water at stage 3, the size and weight of the gravity separator is reduced. A significant growth through coalescence in water and/or oil drop size ensures the gravity separator will perform more effectively and efficiently and require less residence time to process and separate the oil from the water. Where it is known that water cut is not problematic, this stage may be left out of system 10 due to the modular construction of the stages.

Stage 4 is a conventional gravity separator that is greatly reduced in size with respect to flow rate due to the highly efficient operation of system 10. Thus stage 4 preferably incorporates a gravity separator for oil/water/residual gas separation vessel as module 58 of the present invention. To the extent preseparator module 44 is used to produce bulk water, water flows from output 48, through control valve 52, and to bulk water input 57 of gravity separator module 58. Conditioned oil/water flow with enlarged droplet size flows from the combination of outputs 50 and 48 of preseparator module 44 through valve 52 and 54 to input 57. Flow split across the two outputs of preseparator 44 is additionally controlled by valves 52 and 56. Valve 54 is used to alternate between the separation mode of operation or conditioning or combination mode of operation. The appropriate mode of operation will depend on the composition of the stream at 46. Input 60 is where the separated oil from module 44 is directed to the gravity separator module 58 in the separation mode of operation, entering either the oil zone or bucket location.

Stage 4 is necessary to supply a final separation stage for oil, gas, and water in which a residence time in the system is provided for slug ingestion. Stage 4 also provides a buffer tank from which produced water re-injection pumps, for example, can operate. The upstream separation stages discussed hereinbefore act to reduce the size, weight, and cost of the gravity separator module which is typically rather large in surface and in proposed subsea separation systems. The upstream deployment stages also optimize operation efficiency and reliability of gravity separator module 58 as is especially important for subsea processing. Residual gas from module 58 leaves output 62 through valve 64 to connect to output gas line 36. Separated oil flows out at outlet 66 through valve 68 for connection to oil outlet line 70. Water and oily water that need further processing leaves gravity separator module 58 at outlet 72 for input to deoiling liquid-liquid hydrocyclone module 74. As with other modules, if there is little or no problem with water cut, then gravity separator module can be easily eliminated from system 10 due to a preferably modular construction of the stages of operation. However, as noted earlier, if a module is removed then the remaining modules are maintained in the same order previously described.

Stage 5 provides oily water clean-up so that water separated in module 58 of stage 4 may be cleaned prior to disposal. Preferably, module 74 is a deoiling liquid-liquid hydrocyclone that utilizes cyclonic operation to further separate the residual oil from the water. In situations where water is simply reinjected to the well, water clean-up may not be required subject to the re-injection water quality specification. However, another benefit in deploying module 74 as the final stage allows gravity separator to operate at a higher throughput. This is because module 74 treats the resulting higher oil-in-water concentrations resulting is a lower oil/water interface, and a therefore lower residence time in gravity separator module 58. Residual oil flows through output 76 and preferably valve 78 to output oil line. Cleaned water exits system 10 at water connection line 80 from outlet 82 and valve 84.

It will be noted that control valves have been listed herein to indicate control elements over flow operation of system 10 and may be removed and/or additional valves added as necessary. The valves also permit standard modules to be used with valves being opened/closed as necessary where a module is not used.

In summary of operation, system 10 utilizes up to five distinct process steps. The preferred order of the process steps is important because each step compliments and improves the action of subsequent and/or previous process steps. While the number of process steps varies with the configuration of the system due to the type of multiphase fluid to be processed, the modular construction of system 10 permits configuration of the system as desired. Therefore, in generally described terms, multiphase fluid enters system 10 as indicated in FIG. 1 and is directed into cyclone separator 16 where any solids including produced sand or other particulate matter are separated. The initially processed fluid then enters gas-liquid separator 28, that may be of either a cyclone or auger type design as indicated in FIG. 1, where the bulk of free gas is separated. The remaining liquid is directed to preseparator liquid-liquid hydrocyclone 44. Module 44 is operated to remove some produced water from the crude and/or operates to condition the production fluid by growing and coalescing oil in water droplets for a water-continuous stream from outlet 48, or by growing and coalescing water droplets in an oil-continuous stream from outlet 50. The resultant fluid is then directed to separation container or vessel 58 where gravitational separation occurs. Oil is separated from water, and any residual gas not removed from the upstream gas-liquid separator is removed and exported as wet gas. This vessel may contain internal devices to enhance this gravitational separation, however the size of vessel 58 will be significantly smaller than that of conventional systems due to the separating/conditioning effects of upstream devices and downstream separation of deoiler liquid-liquid hydrocyclone 74. The final step includes directing produced water from separator vessel 58 to deoiling liquid-liquid hydrocyclones where oil is removed from the processed water for water reinjection or disposal.

The processed products, wet oil and wet gas may be re-combined and transported, or transported individually to the host facility. Wet gas can be re-injected for pressure maintenance or used to lift low pressure wells. The by-products, water, and solids, can be disposed of locally by discharge to the environment or by reinjection, or be transported back to the host facility for further treatment and disposal.

System 10 preferably consists of five main elements or modules that interact in such a way as to ensure utilization of standard components and that the components interact and fit like small interchangeable building blocks. Only the components required to meet separation specifications need to be provided in system 10 to the preferred modular construction without having to invest in extra equipment that may not be needed. Therefore, system 10 combines the design flexibility of custom equipment, with the simplicity of pre-engineered modules.

The foregoing disclosure and description of the invention is illustrative and explanatory thereof, and it will appreciated by those skilled in the art, that various changes in the organization, general type and shape, and specific materials as well as the details of the illustrated construction or combinations of features of the components and/or process functions may be made without departing from the spirit of the invention.

What is claimed is:

1. A subsea method for separation of multiphase production fluids from one or more wells drilled below a body of water, comprising:
   positioning separation equipment for said separation below a surface of said body of water and in proximity with said one or more wells;
   connecting said one or more wells to said separation equipment to introduce said multiphase production fluids from said one or more wells to said separation equipment;
   operating said separation equipment for separating phases of said multiphase production fluids from said one or more wells in the following sequence:
   separating solids from said multiphase production fluids to produce said solids and a first stage processed fluid;
   separating gas and liquids from said first stage process fluid to produce a gas output and a second stage processed fluid;
   preseparating said second stage processed fluid to produce a third stage processed fluid;
   separating oil and water and any residual gas from said third stage processed fluid to produce an oil output and a fourth stage processed fluid; and
   cleaning of said fourth stage processed fluid to produce a water output and residual oil.

2. The method of claim 1, further comprising:
   utilizing a cyclone separator for said separating of solids from said multiphase production fluids,
   utilizing a cyclone or an augur separator for said separating of gas and liquids from said first stage process fluid to produce said gas output and said second stage processed fluid,
   utilizing a first liquid-liquid hydrocyclone for said preseparating of said second stage processed fluid,
   utilizing a gravity separator vessel for said separating of oil and water and any residual gas from said third stage processed fluid, and
   utilizing a second liquid-liquid hydrocyclone for said cleaning of said fourth stage processed fluid.

3. The method of claim 2, further comprising:
   providing prior to said step of positioning a single framework for rigidly supporting as a unit said separation equipment for which said method further comprises,
   providing a first modularly constructed component comprising said first liquid-liquid hydrocyclone so as to be rigidly attachable to said single framework,
   providing a second modularly constructed component comprising said second liquid-liquid hydrocyclone so as to be rigidly attachable to said single framework,
   providing a third modularly constructed component comprising said gravity separator vessel so as to be rigidly attachable to said single framework, and
   providing a fourth modularly constructed component comprising said cyclone or auger separator.

4. The method of claim 2, further comprising:
   providing prior to said step of positioning a single frame for rigidly supporting as a unit said separation equipment for which said method further comprises:
   providing a first modularly constructed component comprising said first liquid-liquid hydrocyclone so as to be rigidly attachable to said single framework,
   providing a second modularly constructed component comprising said gravity separator vessel so as to be rigidly attachable to said single framework, and
   providing a third modularly constructed component comprising said cyclone or auger separator so as to be rigidly attachable to said single framework.

5. The method of claim 2, further comprising:
   providing prior to said step of positioning a single framework for rigidly supporting as a unit said separation equipment for which said method further comprises:
   said first liquid-liquid hydrocyclone so as to be rigidly attachable to said single framework, and
   said second liquid-liquid hydrocyclone so as to be rigidly attachable to said single framework and said gravity separator vessel.

6. The method of claim 1, wherein said step of preseparating further comprises:

monitoring feed composition to a preseparator liquid-liquid hydrocyclone, and controlling flow split of a plurality of outputs from said preseparator liquid-liquid hydrocyclone.

7. The method of claim 1, further comprising:

designing said step of separating solids from said multiphase production fluids to remove solids having a particulate size as small as fifty microns.

8. A subsurface method for separation of multiphase production fluids from one or more wells drilled below a body of water, comprising:

positioning separation equipment for said separation below a surface of said body of water and in proximity with said one or more wells;

connecting said one or more wells to said separation equipment to introduce said multiphase production fluids from said one or more wells to said separation equipment;

operating said separation equipment for separating phases of said multiphase production fluids from said one or more wells in the following sequence:

separating a gas phase and a liquid phase of said multiphase production fluid from said one or more wells;

subsequently preseparating said liquid phase of said multiphase production fluid;

thereafter processing said liquid phase for separation of an oil phase and a water phase; and cleaning oily water of said water phase.

9. The method of claim 8, further comprising:

providing a cyclone or auger separator for said separating of said gas phase and said liquid phase, providing a preseparator liquid-liquid hydrocyclone for said preseparating of said liquid phase, providing a gravity separator vessel for said processing of said liquid phase for separation of said oil phase and said water phase, and providing a deoiling liquid-liquid hydrocyclone separator for said cleaning of oily water.

10. The method of claim 9, further comprising:

prior to said step of positioning fixably assembling said separation equipment to form a single unit comprising said preseparator liquid-liquid hydrocyclone, said gravity separator vessel, said deoiling liquid-liquid hydrocyclone separator and said cyclone or augur separator wherein said preseparator liquid-liquid hydrocyclone, said gravity separator vessel, said deoiling liquid-liquid hydrocyclone separator and said cyclone or augur separator are each initially mounted on separate modules.

11. The method of claim 9, further comprising:

prior to said step of positioning fixably assembling above a surface of said body of water said separation equipment to form a single unit comprising said preseparator liquid-liquid hydrocyclone, said gravity separator vessel, and said cyclone or augur separator wherein said said preseparator liquid-liquid hydrocyclone, said gravity separator vessel, and said cyclone or augur separator are each initially mounted on separate modules.

12. The method of claim 9, further comprising:

prior to said step of positioning fixably assembling above a surface of said body of water said separation equipment to form a single unit comprising said preseparator liquid-liquid hydrocyclone, said gravity separator vessel, and said deoiling liquid-liquid hydrocyclone separator wherein said preseparator liquid-liquid hydrocyclone, said gravity separator vessel, and said deoiling liquid-liquid hydrocyclone separator are each initially mounted on separate modules.

13. A subsurface method for separation of multiphase production fluids from one or more wells drilled below a body of water, comprising:

positioning separation equipment for said separation below a surface of said body of water and in proximity with said one or more wells;

connecting said one or more wells to said separation equipment to introduce said multiphase production fluids from said one or more wells to said separation equipment;

operating said separation equipment for separating phases of said multiphase production fluids from said one or more wells in the following sequence:

preseparating said multiphase production fluid to produce a preprocessed fluid;

separating an oil phase and a water phase and any residual gas from said preprocessed fluid to produce an oil output an oily water output; and cleaning of said oily water output to produce a water output and residual oil.

14. The method of claim 13, further comprising:

providing a preseparator liquid-liquid hydrocyclone for said preseparating of said multiphase production fluid, providing a gravity separator vessel for said separation of said oil phase and said water phase, and providing a deoiling liquid-liquid hydrocyclone separator for said cleaning of oily water.

15. The method of claim 14, further comprising:

fixably assembling above a surface of said body of water said separation equipment to form a single unit supported by a single frame comprising said preseparator liquid-liquid hydrocyclone, said gravity separator vessel, and said deoiling liquid-liquid hydrocyclone separator.

16. A subsurface method for separation of multiphase production fluids from one or more wells drilled below a body of water, comprising:

positioning separation equipment for said separation below a surface of said body of water and in proximity with said one or more wells;

connecting said one or more wells to said separation equipment to introduce said multiphase production fluids from said one or more wells to said separation equipment;

operating said separation equipment for separating phases of said multiphase production fluids from said one or more wells in the following sequence:

separating an oil phase and a water phase and a gas phase from said multiphase production fluids; and cleaning of oily water from said water phase to produce a water output and residual oil.

17. The method of claim 16, further comprising:

providing a gravity separator vessel for said separation of said oil phase and said water phase, and providing a deoiling liquid-liquid hydrocyclone separator for said cleaning of oily water.

18. The method of claim 16, wherein said separating further comprises steps in the following order:

separating solids from said multiphase production fluids to produce a first stage processed fluid, separating said gas phase and a liquid phase from said first stage processed fluid to produce a second stage processed fluid, and separating an oil phase and a water phase and any residual gas from said second stage processed fluid.

19. The method of claim 18, further comprising:
utilizing a cyclone separator for said separating of solids from said multiphase production fluids,
utilizing a cyclone or auger separator for said separating of gas and liquids from said first stage processed fluid,
utilizing a gravity separator vessel for said separating of said oil phase and said water phase and said residual gas from said second stage processed fluid, and
utilizing a deoiling liquid-liquid hydrocyclone for said cleaning of oily water.

20. The method of claim 19, further comprising:
fixably assembling above a surface of said body of water said separation equipment to form a single unit comprising said gravity separator vessel, and said cyclone or augur separator wherein said gravity separator vessel and said cyclone or augur separator are each initially mounted on separate modules.

21. The method of claim 16, wherein said separating further comprises steps in the following order:
separating solids from said multiphase production fluids to produce a first stage processed fluid, and
separating an oil phase and a water phase and any residual gas phase from first stage processed fluid.

22. The method of claim 21, further comprising:
utilizing a cyclone separator for said separating of solids from said multiphase production fluids,
utilizing a gravity separator vessel for said separating of said oil phase and said water phase and said residual gas from said second stage processed fluid, and
utilizing a deoiling liquid-liquid hydrocyclone for said cleaning of oily water.

23. The method of claim 16, wherein said separating further comprises steps in the following order:
separating a gas phase and a liquid phase from said first stage processed fluid to produce a second stage processed fluid, and
separating an oil phase and a water phase and any residual gas phase from said second stage processed fluid.

24. The method of claim 23, further comprising:
utilizing a cyclone or auger separator for said separating of gas and liquids from said first stage processed fluid,
utilizing a gravity separator vessel for said separating of said oil phase and said water phase and said residual gas from said second stage processed fluid, and
utilizing a deoiling liquid-liquid hydrocyclone for said cleaning of oily water.

25. The method of claim 24, further comprising:
fixably assembling above a surface of said body of water said separation equipment to form a single unit comprising said gravity separator vessel and said cyclone or augur separator wherein said gravity separator vessel and said cyclone or augur separator are each initially mounted on separate modules.

26. A subsurface method for separation of multiphase production fluids from one or more wells drilled below a body of water, comprising:
positioning separation equipment for said separation below a surface of said body of water and in proximity with said one or more wells;
connecting said one or more wells to said separation equipment to introduce said multiphase production fluids from said one or more wells to said separation equipment;
operating said separation equipment for separating phases of said multiphase production fluids from said one or more wells in the following sequence:
separating of a gas phase and a liquid phase to produce a gas output and a processed fluid;
separating an oil phase and water phase and any residual gas from said processed fluid to produce an oil output and a water output.

27. The method of claim 26, further comprising:
utilizing a cyclone or an augur separator for said separating of said gas and said liquid phase,
utilizing a gravity separator vessel for said separating of said oil phase and said water phase and said residual gas from said processed fluid.

28. The method of claim 27, further comprising:
fixably assembling above a surface of said body of water prior to said step of positioning a single framework for rigidly supporting as a unit said gravity separator vessel, and said cyclone or auger separator.

29. A subsurface method for separation of multiphase production fluids from one or more wells drilled below a body of water comprising:
positioning separation equipment for said separation below a surface of said body of water and in proximity with said one or more wells;
connecting said one or more wells to said separation equipment to introduce said multiphase production fluid from said one or more wells to said separation equipment;
operating said separation equipment for separating phases of said multiphase production fluids from said one or more wells in the following s equence:
separating solids from said multiphase production fluid of said one or more wells to produce solids and a processed fluid; and
separating an oil phase and a water phase and any residual gas from said processed fluid to produce an oil output and a water output.

30. The method of claim 29, further comprising:
utilizing a cyclone separator for said separating of solids from said multiphase production fluid, and
utilizing a gravity separator vessel for said separating of oil and water and any residual gas from said processed fluid.

31. The method of claim 30, further comprising:
fixably assembling providing prior to said step of positioning a single framework for rigidly supporting as a unit said cyclone separator and said gravity separator vessel wherein said gravity separator vessel and said cyclone separator are each initially mounted to a separate module.

32. A subsurface method for separation of multiphase production fluids from one or more wells drilled below a body of water, comprising:
positioning separation equipment for said separation below a surface of said body of water and in proximity with said one or more wells;
connecting said one or more wells to said separation equipment to introduce said multiphase production fluid from said one or more wells to said separation equipment;
operating said separation equipment for separating phases of said multiphase production fluids from said one or more wells in the following sequence:
separating solids from said multiphase production fluid of said one or more wells to produce solids; and separating of a gas phase and a liquid phase to produce a gas output and a processed fluid.

33. The method of claim 32, further comprising:

utilizing a cyclone separator for said separating of solids from said multiphase production fluid, and utilizing a cyclone or an augur separator for said separating of said gas and said liquid phase.

34. A subsea system for separating a multiphase fluid from one or more subsea wells, comprising:

a separator system frame for rigidly supporting said subsea system suitable for operation in a subsea environment;

a first cyclone separator rigidly secured to said separator system frame and being operable for removing solids from said multiphase fluid, said first cyclone separator being adapted for connection with said one or more subsea wells for receiving said multiphase fluid;

a gravity separator rigidly secured to said separator system frame; and a first fluid connection downstream from said cyclone separator to said gravity separator.

35. The subsea system of claim 34, further comprising:

a preseparator liquid-liquid hydrocyclone rigidly secured to said separator frame, a second fluid connection downstream from said cyclone separator to said preseparator liquid-liquid hydrocyclone, said gravity separator being connected being connected downstream and in direct communication with said preseparator liquid-liquid hydrocyclone.

36. The subsea system of claim 34, further comprising:

a cyclone or auger separator rigidly secured to said separator frame and being operable for separating a gas phase from a fluid phase, and an interconnection from said first cyclone separator to said cyclone or auger separator, said gravity separator being connected being connected downstream from said cyclone or auger separator.

37. The subsea system of claim 34, further comprising:

a deoiling liquid-liquid hydrocyclone operable for cleaning of oily water, a connection for receiving said oily water between said gravity separator and said deoiling liquid-liquid hydrocyclone.

38. A subsea system for separating a multiphase fluid from one or more subsea wells, comprising:

a separator system frame for rigidly supporting said subsea system suitable for operation in a subsea environment;

at least two of the following five components rigidly secured to said separator system frame consisting of the following: a cyclone separator operable for removing solids from said multiphase fluid, a cyclone or augur separator operable for removing a gas phase from a liquid phase, a preseparator liquid-liquid hydrocyclone operable for enhancing separation of an oil phase and a water phase, a gravity separator operable for separating said oil phase and said water phase, and a deoiling liquid-liquid hydrocyclone operable for deoiling oily water;

said at least two of the following five components being interconnected with each other such that when used each of said at least two of the following five components are arranged in the following order for processing said multiphase fluid: said cyclone separator, said cyclone or augur separator, said preseparator liquid-liquid hydrocyclone, said gravity separator, and said deoiling liquid-liquid hydrocyclone.

39. The system of claim 38, further comprising:

said cyclone separator operable for removing solids from said multiphase fluid and said at least two of the five components other than said cyclone separator.

40. The system of claim 38, further comprising:

said gravity separator and said at least two of the five components other than said gravity separator.

41. A subsea method for separation of multiphase production fluids from one or more wells drilled below a body of water, comprising:

positioning separation equipment for separation of multiphase production fluids below a surface of said body of water and in proximity with said one or more wells;

connecting said one or more wells to said separation equipment to introduce said multiphase production fluids from said one or more wells to said separation equipment;

operating said separation equipment for separating phases of said multiphase production fluids such that at least two of the following five processes are provided: separating solids from said multiphase fluid, separating a gas phase and a liquid phase, liquid-liquid preseparating to enhance separation of an oil phase and a water phase, gravity separating said oil phase and said water phase, and cleaning oily water to produce water and residual oil; and each of said at two of the five processes when used being operated in the sequence of operation as follows: said step of separating solids from said multiphase fluid, said step of separating said gas phase and said liquid phase, said liquid-liquid preseparating, said step of gravity separating, and said step of cleaning oily water to produce water and residual oil.

42. The method of claim 41, further comprising:

utilizing the following group of components for each when used of said at least two of the five processes: a cyclone separator for said step of separating of solids from said multiphase production fluids, a cyclone separator for said step of said step of separating solids from said multiphase fluid, a cyclone or auger for said step of separating said gas phase and said liquid phase, a liquid-liquid hydrocyclone for said step of liquid-liquid preseparating, a gravity separator for said step of gravity separating, and a liquid-liquid deoiling hydrocyclone for said step of cleaning oily water to produce water and residual oil.

43. The method of claim 42, further comprising:

providing a single frame and rigidly securing a modular component related to each of said steps to said single frame to form said separation equipment.

* * * * *